(12) United States Patent
Ozaki

(10) Patent No.: US 7,845,861 B2
(45) Date of Patent: Dec. 7, 2010

(54) OPTICAL MODULE

(75) Inventor: Masahito Ozaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 505 days.

(21) Appl. No.: 11/846,117

(22) Filed: Aug. 28, 2007

(65) Prior Publication Data

US 2008/0050122 A1 Feb. 28, 2008

(30) Foreign Application Priority Data

Aug. 28, 2006 (JP) ............................. 2006-229966

(51) Int. Cl.
*G02B 6/36* (2006.01)
*H04B 10/00* (2006.01)

(52) U.S. Cl. ............................. 385/92; 385/88; 385/52; 385/14; 398/135; 398/139

(58) Field of Classification Search ................... 385/14, 385/52, 88, 89, 92, 93, 94; 398/135, 136, 398/137, 138, 139
See application file for complete search history.

(56) References Cited

U.S. PATENT DOCUMENTS

| | | | |
|---|---|---|---|
| 5,305,408 A | | 4/1994 | Schaffer et al. |
| 5,412,748 A | * | 5/1995 | Furuyama et al. ............. 385/92 |
| 6,470,103 B2 | * | 10/2002 | Watanabe ..................... 385/14 |
| 6,600,611 B2 | * | 7/2003 | Inujima et al. .............. 359/808 |
| 7,287,914 B2 | * | 10/2007 | Fujiwara et al. ............... 385/88 |
| 2006/0098923 A1 | * | 5/2006 | Fujiwara et al. ............... 385/88 |

FOREIGN PATENT DOCUMENTS

| | | | |
|---|---|---|---|
| DE | 102005011423 A1 | 10/2005 | |
| DE | 102006005070 A1 | 8/2006 | |
| JP | 2004-20894 A | 1/2004 | ............... 385/92 X |
| JP | 2005-91416 A | 4/2005 | ............... 385/92 X |
| WO | 2006063807 A2 | 6/2006 | |

OTHER PUBLICATIONS

German Office Action for Application No. 10 2007 040 537.7, mailed Jun. 22, 2010.

* cited by examiner

*Primary Examiner*—Brian M Healy
(74) *Attorney, Agent, or Firm*—Sughrue Mion, PLLC

(57) ABSTRACT

To provide an optical module capable of improving the workability for a circuit substrate, in the rear of a shield case (22), a pressing portion (27) for holding an FOT (6) is formed to press a back surface of a package portion (9) of the FOT (6). In the rear of the shield case (22), a stress countermeasure portion (28) is formed to distribute or mitigate a stress occurring due to deformation and displacement of the pressing portion (27). The stress countermeasure portion (28) is formed between the pressing portion (27) and a substrate connection portion (16). The stress countermeasure portion (28) is formed in the vicinity of the pressing portion (27). In a small space between a base (or bend portion) of the pressing portion (27) and the stress countermeasure portion (28), the force in a twist direction acts due to the occurred stress. This force is distributed or absorbed according to presence and shape of the stress countermeasure portion (28).

3 Claims, 6 Drawing Sheets

OPTICAL MODULE

BACKGROUND OF THE INVENTION

1. Field of the Invention

The present invention is relating to an electronic component module attached to a circuit substrate, for covering an electronic component with a shield component, and more particularly to an optical module such as an optical connector or a hybrid connector and a pigtail type optical module.

2. Description of the Related Art

Hereinafter, a pigtail type optical module disclosed in the following Patent Document 1 will be described. In FIG. 6(a), a pigtail type optical module 1 includes an optical connector portion (not shown), a light receiving/emitting portion 3 connected and fixed to a circuit substrate 2, relay optical fibers 4, 4 in which one end is connected to the connector portion and the other end is connected to the light receiving/emitting portion 3, and an optical fiber holding component 5 for holding the optical fibers 4, 4 and preventing an unnecessary force from being applied to the light receiving/emitting portion 3.

In FIG. 6(b), the light receiving/emitting portion 3 is provided with an FOT at a light emitting side having a light emitting device and an FOT at a light receiving side having a light receiving device (of which only one is shown in the drawing) (hereinafter, referred to as FOT 6), an FOT case 7 for fixing the FOT 6, and a shield case 8 for preventing electromagnetic noise by covering the FOT 6 and the FOT case 7. The FOT 6 has a resin molded package portion 9 and a plurality of lead frames 10. Although not shown, four lead frames 10 are arranged in one row. (Because of two FOTs 6, eight lead frames 8 can be arranged in one row.) Each lead frame 10 is inserted and soldered into a connection hole of the circuit substrate 2 and is connected to a target circuit.

The FOT case 7 has a fixing portion 11 for fixing the package portion 9 of the FOT 6 and a lead frame fixing portion 12 for inserting and fixing each lead frame 10. Although not shown in detail, a portion (or optical fiber connection tube portion) denoted by reference numeral 13 in the FOT case 7 is fixed to the other end of the optical fiber 4, such that the other end faces the device of the FOT 6. The lead frame fixing portion 12 is formed in a comb tooth shape.

The shield case 8 is formed in a box shape. In this shield case 8, partially pin-shaped substrate connectors 14, 16, and 18 are formed. In the shield case 8, pressing portions 17, 17 (of which only one is shown in the drawing) are respectively formed to hold the FOT 6 by pressing a back surface of the package portion 9 of the FOT 6. Like the lead frames 10 of the FOT 6, the substrate connection portions 14, 16, 16 are respectively inserted and soldered into the circuit substrate 2 to be connected and fixed thereto.

The substrate connection portion 14 is arranged and formed to both left and right sides of the shield case 8. The substrate connection portion 15 is arranged and formed in the center of the front of the shield case 8. The substrate connection portion 16 is arranged and formed below each pressing portion 17 in the rear of the shield case 8.

In addition, the following Patent Document 2 can also be considered as the related art.

Patent Document 1: JP-A-2005-91416
Patent Document 2: JP-A-2004-20894

However, since the pressing portion 17 of the shield case 8 has a structure for pressing the package portion 9 of the FOT 5 in the above-described prior art and the shield case 8 is manufactured by processing a thin metal plate, there is a problem in that the rear of the shield case 8 may be bent as shown in FIG. 6(c) (see a virtual line of the drawing with exaggeration). Accordingly, the pin-shaped substrate connection portion 16 may be also displaced. When the substrate connection portion 16 is displaced, its end position is shifted, such that a connection with the circuit substrate 2 may not be smoothly established. These are problems occurring in the prior art (or problems occurring in the techniques of Patent Documents 1 and 2).

It is difficult to correct the bend occurred in the rear of the shield case 8 in a job site of an assembly line. Bending and adjusting the substrate connection portion 16 is taken as an emergency treatment. This is the very complex work.

SUMMARY OF THE INVENTION

The invention has been made in view of the foregoing situation and it is an object of the invention to provide an optical module capable of improving the workability for a circuit substrate.

In order to solve the problems, according to a first aspect of the invention, there is provided an optical module including a fiber optic transceiver (FOT) having a light emitting element and/or a light receiving element, a shield case for covering and shielding the FOT, and a pressing portion, formed in the shield case, directly or indirectly contributing to positioning the FOT, including: a stress countermeasure portion, formed between the pressing portion and a substrate connection portion of the shield case, for distributing, absorbing, or mitigating a stress due to deformation and displacement of the pressing portion.

According to the above aspect of the invention, the stress occurring due to the deformation and displacement of the pressing portion is applied to the stress countermeasure portion when the shield case is attached and the pressing portion of the shield case directly or indirectly presses the FOT. The stress countermeasure portion distributes (or absorb or mitigate) the stress. Consequently, the force applied to the substrate connection portion of the shield case is further reduced and prevented in comparison with the case where the stress countermeasure portion is absent. If the force applied to the substrate connection portion is reduced and prevented, the position of the substrate connection portion is not shifted and the next work for the circuit substrate is suitably performed.

The stress countermeasure portion or the pressing portion will be described in detail in "Best Mode for Carrying Out the Invention".

An optical module according to a second aspect of the invention is the optical module according to the first aspect, in which a formation range of the stress countermeasure portion is set to a range equal to or more than a width of the pressing portion and a range more than a width of the substrate connection portion.

According to the above aspect of the invention, a structure is formed such that the stress occurring due to the deformation and displacement of the pressing portion is not applied to, or does not act on, the substrate connection portion while bypassing the stress countermeasure portion. It is more difficult for the stress to be applied to the substrate connection portion by broadly setting the formation range of the stress countermeasure portion. Therefore, the displacement of the substrate connection portion can be surely prevented.

An optical module according to a second aspect of the invention is the optical module according to the first or second aspect, in which the stress countermeasure portion is arranged and formed around the pressing portion.

According to the above aspect of the inventions the stress countermeasure portion distributes (or absorbs or mitigates)

the stress before the effect of the stress occurring due to the deformation and displacement of the pressing portion extends.

According to the first aspect of the invention, the stress countermeasure portion can distribute (or absorb or mitigate) the stress occurring due to the deformation and displacement of the pressing portion. Accordingly, the position of the substrate connection portion can be further stabilized in comparison with that of the prior art by preventing the stress from being applied to the substrate connection portion. Therefore, the workability for the circuit substrate can be further improved in comparison with the conventional workability.

According to the second aspect of the invention, there can be prevented the occurrence of the stress directly acting on the substrate connection portion while bypassing the stress countermeasure portion. Therefore, the position of the substrate connection portion can be surely stabilized.

According to the third aspect of the invention, the effect of the stress occurring due to the deformation and displacement of the pressing portion can be minimized without extending the stress.

DESCRIPTION OF THE PREFERRED EMBODIMENTS

Figure 1:
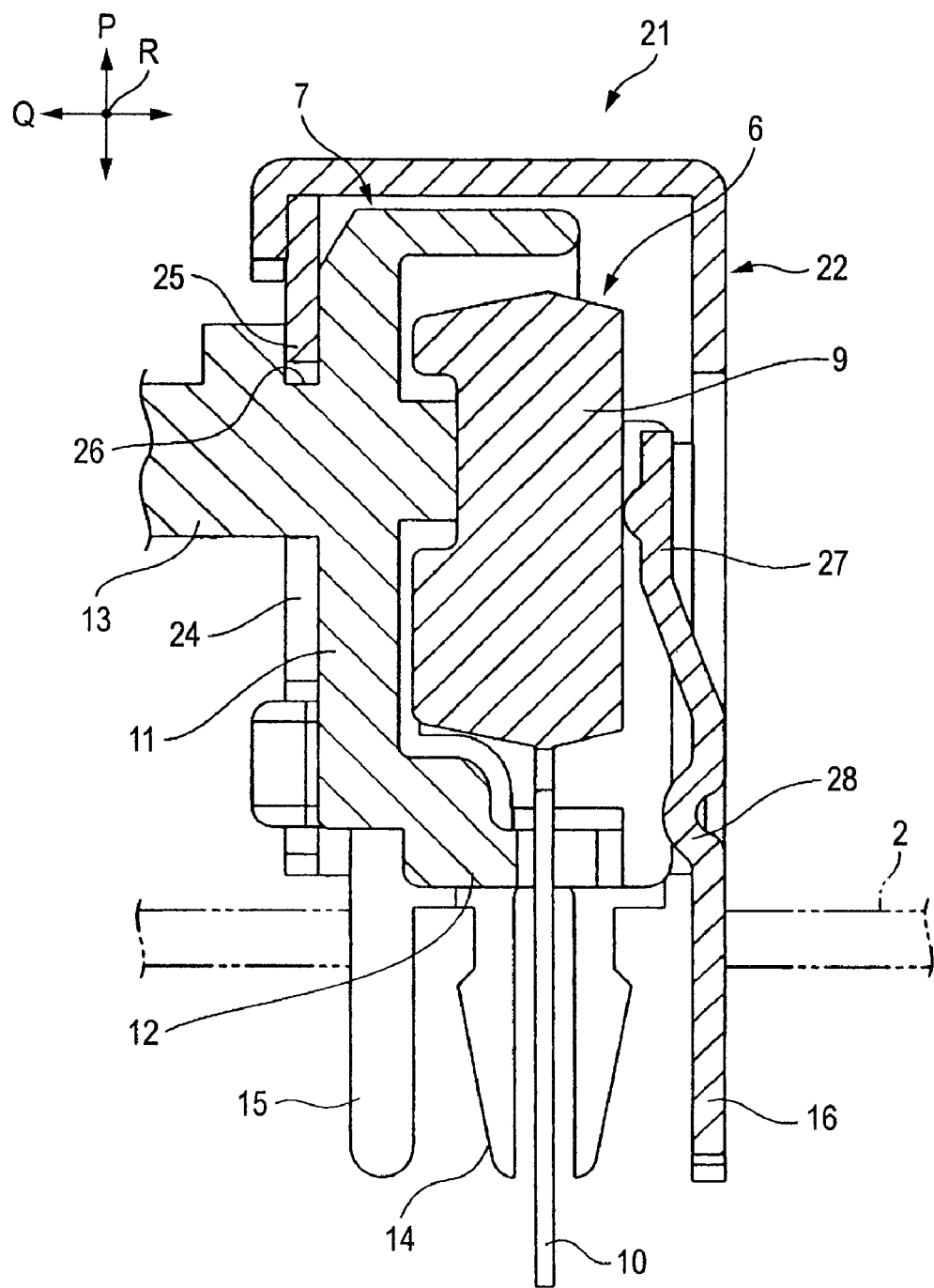
FIG. 1 is a cross-sectional view showing an embodiment of an optical module of the invention.
Figure 2A:
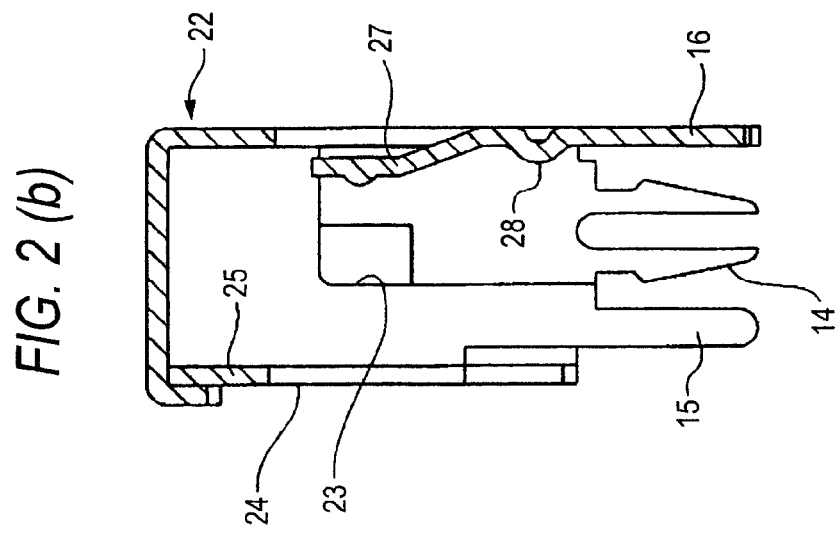
FIG. 2 is a view of a shield case, (a) is a perspective view of a rear side, and (b) is a cross-sectional view of main portions.
Figure 2B:
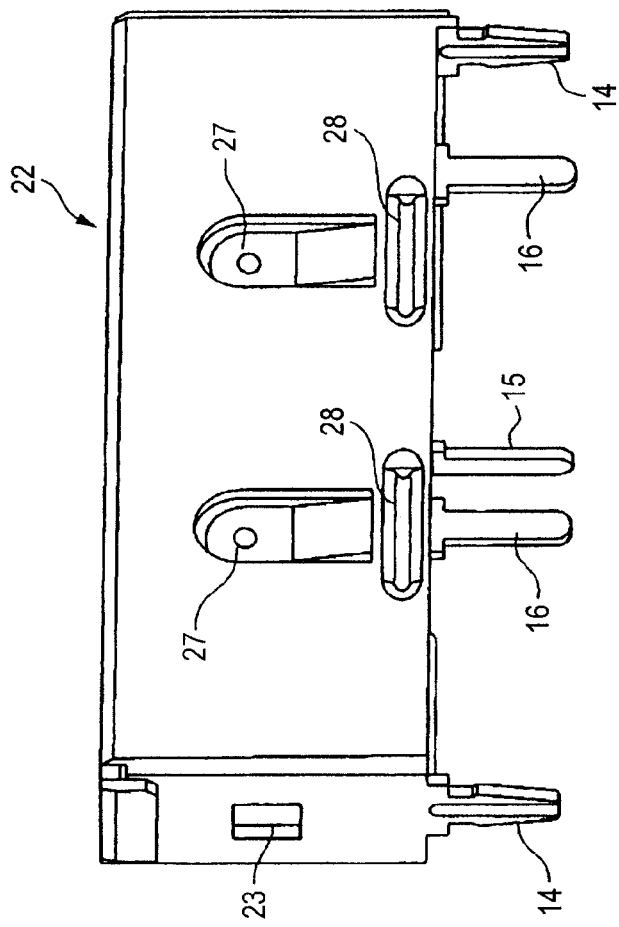

A description will be given with reference to the accompanying drawings. FIG. 1 is a cross-sectional view of a light receiving/emitting portion showing an embodiment of an optical module of the invention. FIG. 2 is a view of a shield case, (a) is a perspective view of a rear side, and (b) is a cross-sectional view of main portions. The same components as those in the example of the prior art are assigned the same reference numerals and a detailed description is omitted.

In FIG. 1, a pigtail type optical module is not especially limited, but includes an optical connector portion (not shown), a light receiving/emitting portion 21 connected and fixed in a predefined position of a circuit substrate 2, and relay optical fibers (4, 4) in which one end is connected to the connector portion and the other end is connected to the light receiving/emitting portion 21. The light receiving/emitting portion 21 includes an FOT at a light emitting side having a light emitting device and an FOT at a light receiving side having a light receiving device (of which one is shown in the drawing) (hereinafter, referred to as FOTs 6), an FOT case 7 for fixing the FOT 6, and a shield case 22 for preventing electromagnetic noise by covering the FOT 6 and the FOT case 7. Alternatively, the light receiving/emitting portion 21 can be configured with only one of the FOT at the light emitting side and the FOT at the light receiving side.

The invention has a noticeable feature in the shield case 22. When the circuit substrate 2 is attached in this feature, the workability is further improved in comparison with the conventional workability. Next, the shield case 22 will be described with reference to FIGS. 1 and 2. In FIG. 1, a P direction is defined as a vertical direction, a Q direction is defined as an anteroposterior direction, and an R direction perpendicular to the paper is defined as a horizontal direction.

As shown, the shield case 22 is formed in a box-like shape in which a lower side is open by performing punching and bending processes for a metal plate having conductivity. The shield case 22 is configured such that the FOT case 7 to which the FOT 6 is fixed can be inserted from an opening of the lower side and the inserted FOT case 7 and the like can be locked in locking portions 23, 23 of both left and right sides.

In the front of the shield case 22, approximately U-shaped slits 24, 24 (of which only one is shown in the drawing) passing through each optical fiber connection tube portion 13 of the inserted FOT case 7 are formed in an inner part thereof. A part 25 of each slit 24 is inserted into a groove portion 26 formed in a base of the optical fiber connection tube portion 13 of the FOT case 7.

In the opening of the lower side of the shield case 22, pin-shaped substrate connection portions 14, 15, and 16 are formed. The substrate connection portions 14, 14 are arranged and formed to both left and right sides of the shield case 22. The substrate connection portion 15 is arranged and formed in the center of the front of the shield case 22. The substrate connection portions 16, 16 are respectively arranged and formed below pressing portions 27, 27 as described below in the rear of the shield case 22.

In the rear of the shield case 22, the pressing portions 27, 27 are respectively formed to hold the FOT 6 by pressing the back surface of the package portion 9 of the FOT 6. Moreover, in the rear of the shield case 22, stress countermeasure portions 28, 28 are formed to distribute or absorb the stress occurring due to the deformation and displacement of the pressing portions 27, 27.

In this embodiment, the pressing portions 27, 27 are respectively formed as cantilever-shaped plate springs. In approximately reed-shaped plate springs extending in the vertical direction, the pressing portions 27, 27 are farmed such that upper parts (or leading ends) thereof press the back surface of the package portion 9 of the FOT 6. Moreover, lower parts of the pressing portions 27, 27 are configured with bases of the plate springs, and are bent in the inner side of the shield case 22 at a predefined angle. The upper parts of the pressing portions 27, 27 are bent to be approximately parallel to the back surface of the package portion 9. In the upper parts of the pressing portions 27, 27, convex portions for pressing the back surface of the package portion 9 in a point. The shape and direction of the pressing portions 27, 27 of the drawing (extending in the vertical direction) are illustrated as an example. The pressing portions 27, 27 are respectively formed for positioning the FOT 6.

The stress countermeasure portions 28, 28 are arranged and formed between the pressing portions 27, 27 and the substrate connection portions 16, 16. The stress countermeasure portions 28, 28 have different functions according to shapes, but are formed to distribute, absorb, or mitigate the stress occurring due to the deformation and displacement of the pressing portions 27, 27. In this embodiment, the stress is distributed or absorbed, and an indent shape is formed to directly extend in the horizontal direction. The stress countermeasure portions 28, 28 are formed to prevent the displacement of the substrate connection portions 16, 16.

If the positions of the substrate connection portions 16, 16 are not changed, it means that the positions of the substrate connection portions 16, 16 are not changed before and after the FOT case 7 to which the FOT 6 is fixed is inserted into the shield case 22. The small displacement is neglected such that the connection work for the circuit substrate 2 can be smoothly performed.

The stress countermeasure portions 28, 28 have the length set according to the width of the pressing portions 27, 27 (in a range equal to or more than the width in the horizontal direction and a range more than the width of the substrate connection portion 16). Specifically, the length is set such that the stress occurring due to the deformation and displacement of the pressing portions 27, 27 does not act on the substrate connection portions 16, 16 while bypassing the stress countermeasure portions 28, 28. For example, when the pressing portions 27, 27 and the substrate connection portions 16, 16 are connected in a line, the stress countermeasure portions 28, 28 are formed in a position across the line (or are formed in a length across the line).

The stress countermeasure portions 28, 28 are arranged and formed in the vicinity of the pressing portions 27, 27. The stress countermeasure portions 28, 28 are arranged and formed in the above-described position to distribute or absorb the stress before the stress effect extends. These stress countermeasure portions 28, 28 are formed with convex portions in the inner side of the shield case 22. For example, the convex shape is formed such that the contour forms a circular arc in cross-sectional view. Moreover, the stress countermeasure portions 28, 28 are formed such that both ends in the horizontal direction thereof are discontinuous to the rear of the shield case 22. That is, the stress countermeasure portions 28, 28 are formed in a state in which both left and right ends thereof are notched. If the notch is present, the stress can be prevented from being transferred in the horizontal direction when the stress is applied to the stress countermeasure portions 28, 28. The function of the stress countermeasure portions 28, 28 can be easily performed.

When an attachment is performed by inserting the FOT case 7 to which the FOT 6 is fixed into the shield case 22 in the configuration as described above, the pressing portions 27, 27 in which the leading ends are located in the inner side of the shield case 22 are externally bent, such that the back surface of the package portion 9 of each FOT 6 is pressed by the pressing portions 27, 27. When the pressing portions 27, 27 are deformed and displaced due to the bends the force acts in a twist direction by the stress occurred in a small space between the bases (or bend portions) of the pressing portions 27, 27 and the stress countermeasure portions 28, 28. This force is distributed or absorbed according to the presence and shape of the stress countermeasure portions 28, 28.

Accordingly, the force does not directly act on the substrate connection portions 16, 16. The positions of the substrate connection portions 16, 16 are not changed before and after the FOT case 7 to which the FOT 6 is fixed is inserted into the shield case 22. When the positions are not changed, the workability for the circuit substrate 2 is further improved in comparison with the conventional workability.

Figure 3:
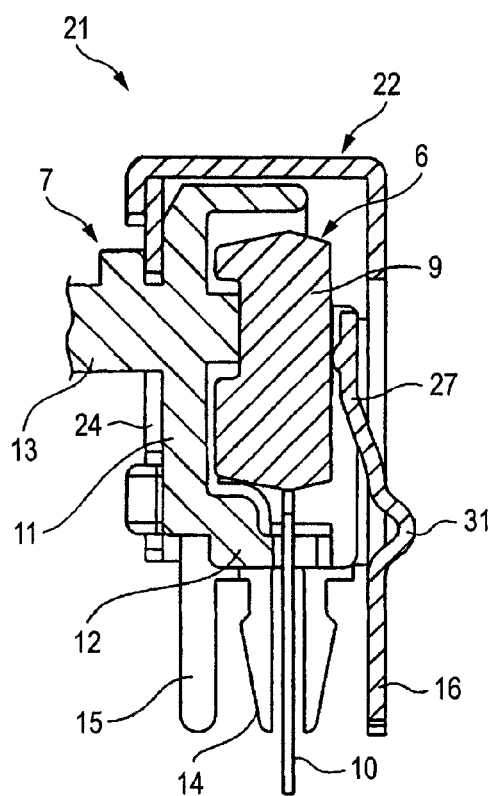
FIG. 3 is a cross-sectional view showing another example of a stress countermeasure portion.
Figure 3:
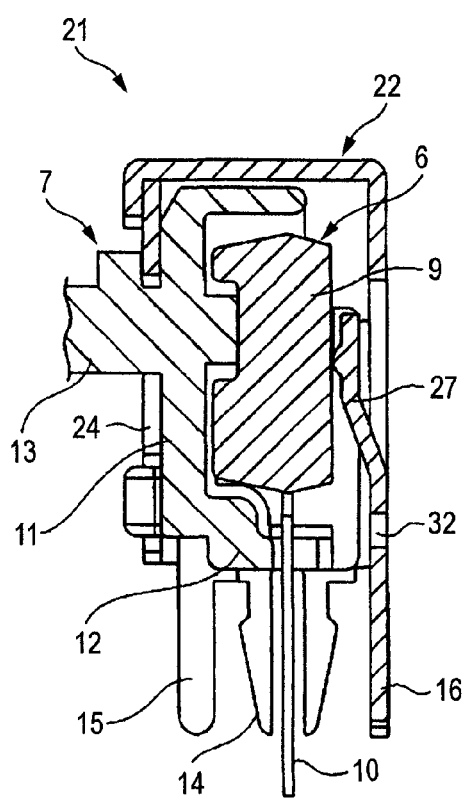

Next, another example of the stress countermeasure portion will be described with reference to FIG. 3. FIG. 3 is a cross-sectional view showing the other example of the stress countermeasure portion.

In FIG. 3(a), a stress countermeasure portion 31 has the following difference from the stress countermeasure portion 28 (see FIG. 1). That is, the above-described stress countermeasure portion 28 is formed in the convex shape in the inner side of the shield case 22, whereas the stress countermeasure portion 31 is formed in the outer side in a convex shape. This difference is present, but the effect is not different from that as described above.

In FIG. 3(b), a stress countermeasure portion 32 has the following difference from the above-described stress countermeasure portion 28 and the above-described stress countermeasure portion 31. That is, the above-described stress countermeasure portions 28 and 31 are formed in the convex shape in the inner and outer sides of the shield case 22, whereas the stress countermeasure portion 32 is formed in a through-hole shape. This difference is present, but the effect is not different from those as described above.

Although not shown, it can be understood that the stress is mitigated by arranging two stress countermeasure portions 28 in the vertical direction to form one stress countermeasure unit or arranging several stress countermeasure portions 28 whose length is short in the horizontal direction to form the stress countermeasure unit. For example, it can be understood that the deformation due to the stress is forcibly suppressed by forming one or more ribs serving as the stress countermeasure portion extending in the vertical direction.

Figure 4:
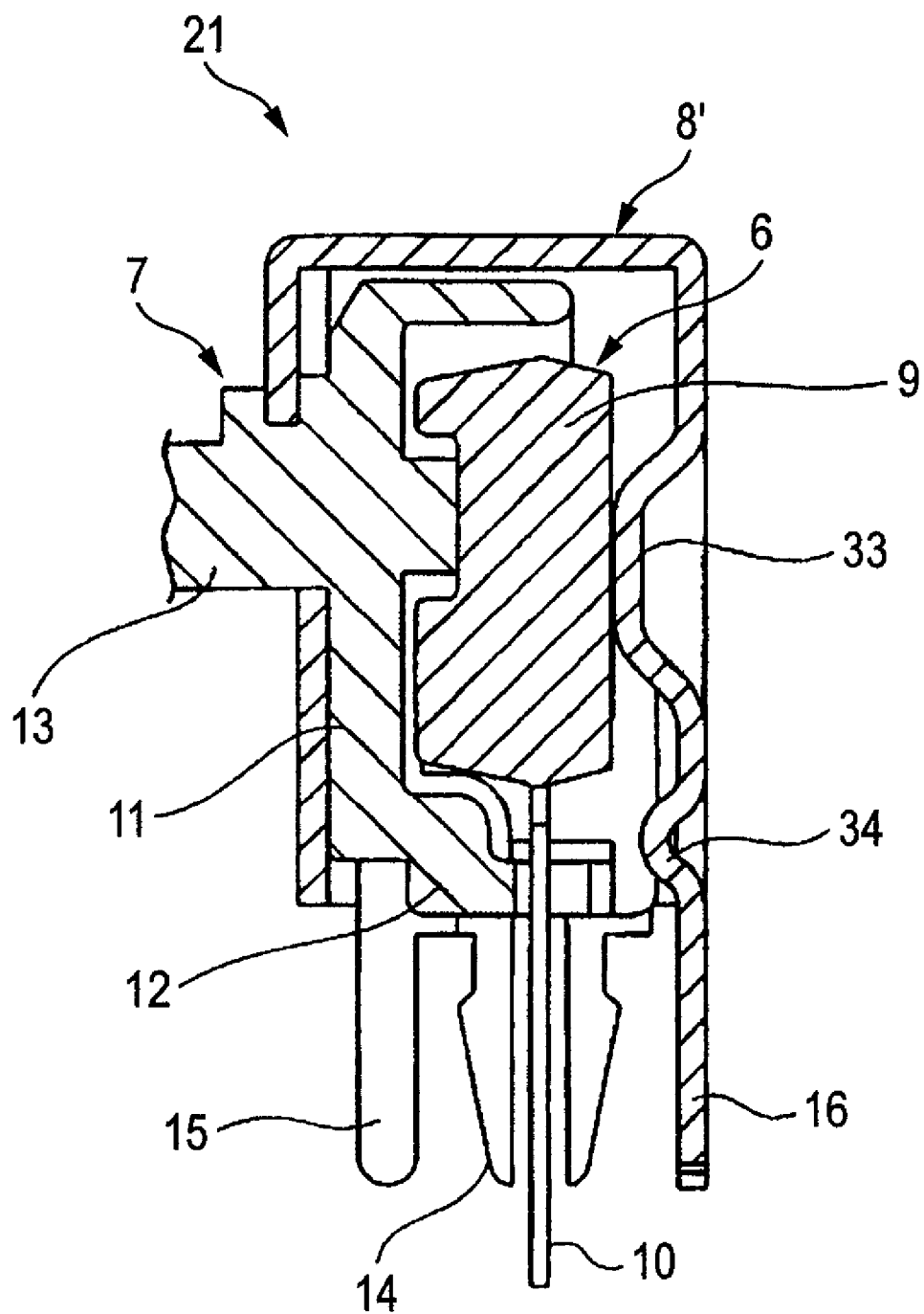
FIG. 4 is a cross-sectional view showing another example of a pressing portion and a stress countermeasure portion.

Next, another example of the pressing portion and the stress countermeasure portion will be described with reference to FIG. 4. FIG. 4 is a cross-sectional view showing the other example of the pressing portion and the stress countermeasure portion.

Figure 6:
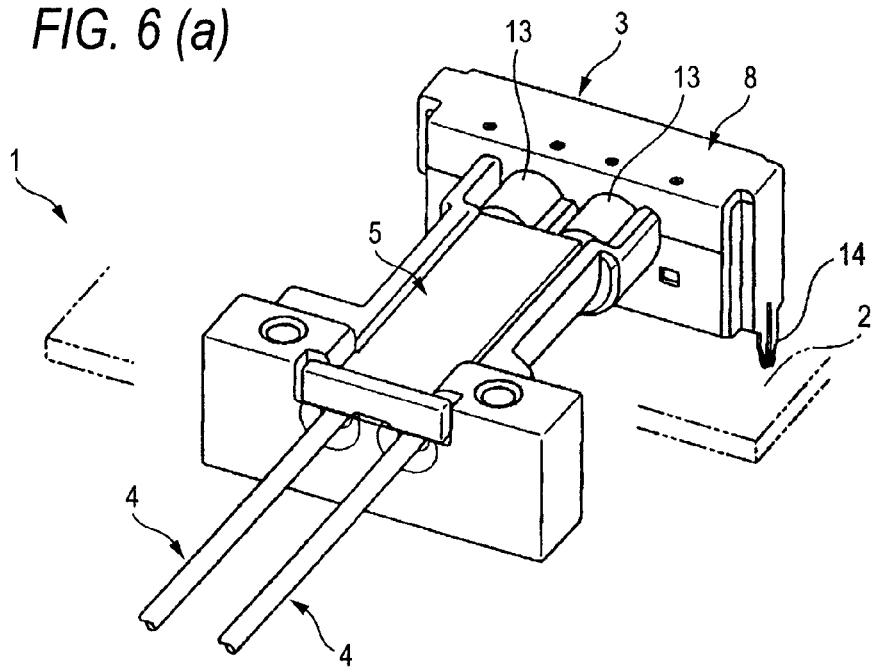
FIG. 6 is a view of an example of a conventional optical module, (a) is a perspective view of a light receiving/emitting portion, and (b) is a cross-sectional view of the light receiving/emitting portion, and (c) is a cross-sectional view showing a problem.
Figure 6:
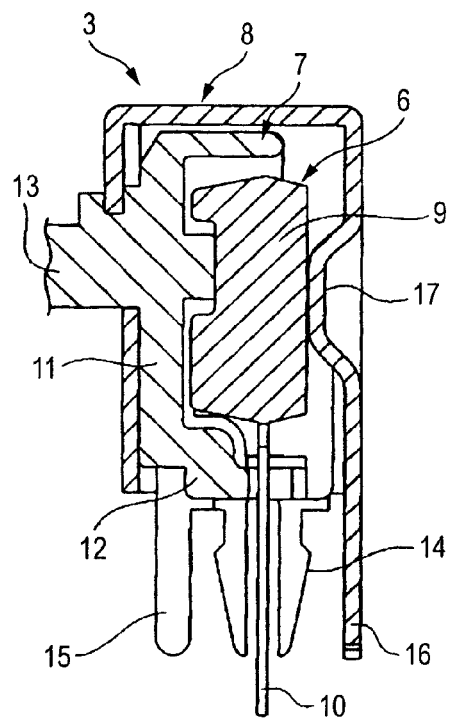
Figure 6:
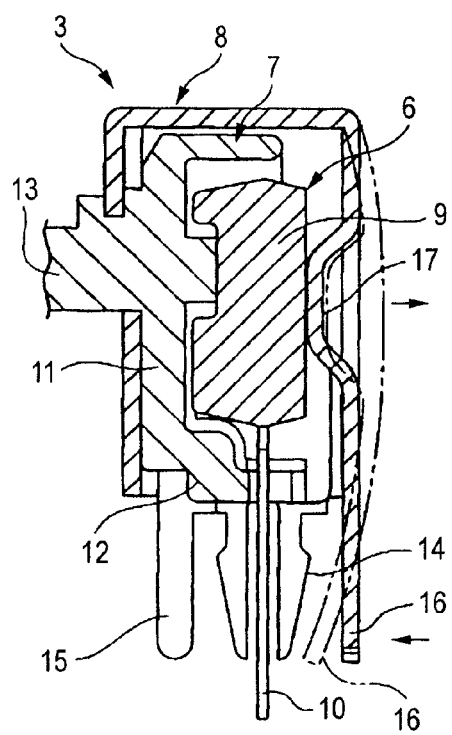

In FIG. 4, the pressing portion 33 is formed in the shape as described in the prior art. That is, the pressing portion 33 (corresponding to the portion denoted by reference numeral 17 of FIG. 6) is formed in the inner side of a shield case 8' in a rectangular convex shape rather than a plate spring shape. Since the occurred stress increases in the case of the pressing portion 33 having the shape as described above, a stress countermeasure portion 34 is formed to have a longer length than the stress countermeasure portion 28 in the horizontal direction.

Figure 5:
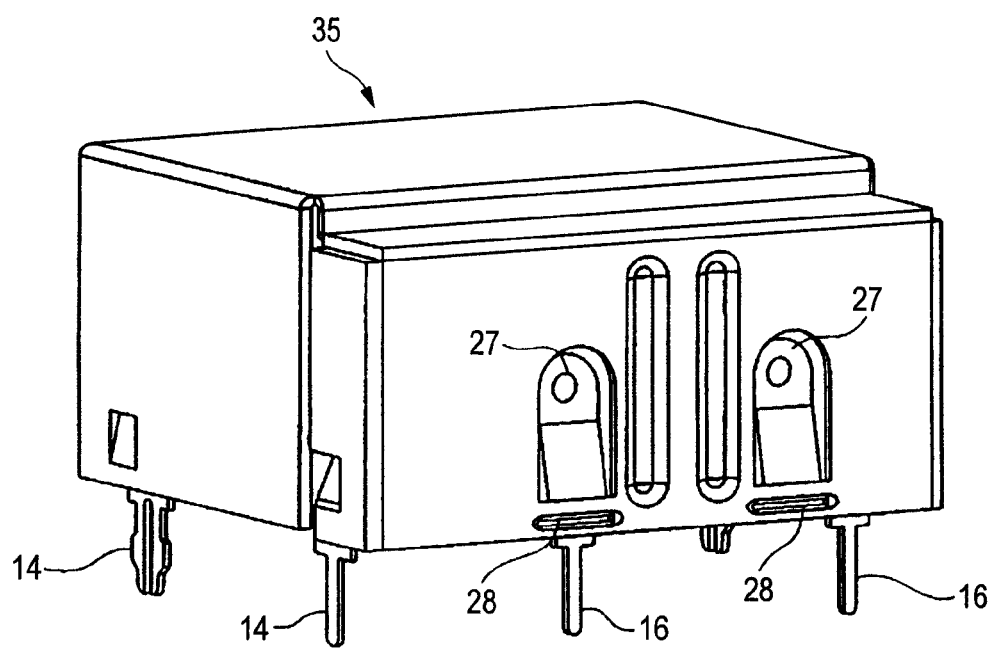
FIG. 5 is a perspective view of another example of the shield case.

The shield case 22 as described up to now has a structure for covering the FOT case 7 in which the FOT 6 is accommodated. Alternatively, a structure can correspond to a housing having a fitting portion into which an opposite side optical connector is fitted and a unified FOT accommodating portion formed in the rear of the fitting portion. That is, there can be used a shield case 35 (see FIG. 5) having a structure for covering the overall housing in a state in which the FOT is fixed to the FOT accommodating portion.

The pressing portion 27 (33) as described up to now is formed in a structure for pressing the back surface of the package portion 9 of the FOT 6. Alternatively, the FOT can be indirectly pressed in a structure for pressing the FOT case in which the FOT is accommodated.

Of course, various changes may be made without departing from the spirit and scope of the invention.

In the case of an electronic component module, attached to a circuit substrate, for covering an electronic component with a shield component according to the invention, an optical module including an FOT having a light emitting element and/or a light receiving element, a shield case for covering and shielding the FOT, and a pressing portion, formed in the shield case directly or indirectly contributing to positioning the FOT, includes: a stress countermeasure portion, formed between the pressing portion and a substrate connection portion of the shield case, for distributing, absorbing, or mitigating a stress due to deformation and displacement of the pressing portion.

What is claimed is:

1. An optical module, comprising:
   a fiber optic transceiver (FOT) having a light emitting element and/or a light receiving element;
   a shield case covering and shielding the FOT;
   a pressing portion formed in the shield case and directly or indirectly contributing to positioning the FOT, and
   a stress countermeasure portion formed between the pressing portion and a substrate connection portion of the shield case and distributing, absorbing, or mitigating a stress due to deformation and displacement of the pressing portion.

2. The optical module according to claim 1, wherein a formation range of the stress countermeasure portion is set to a range equal to or more than a width of the pressing portion and a range more than a width of the substrate connection portion.

3. The optical module according to claim 1 or 2, wherein the stress countermeasure portion is arranged and formed around the pressing portion.

* * * * *